Dec. 12, 1933.  W. L. WRIGHT  1,938,950
OPTICAL SYSTEM FOR PROJECTORS
Filed March 2, 1931
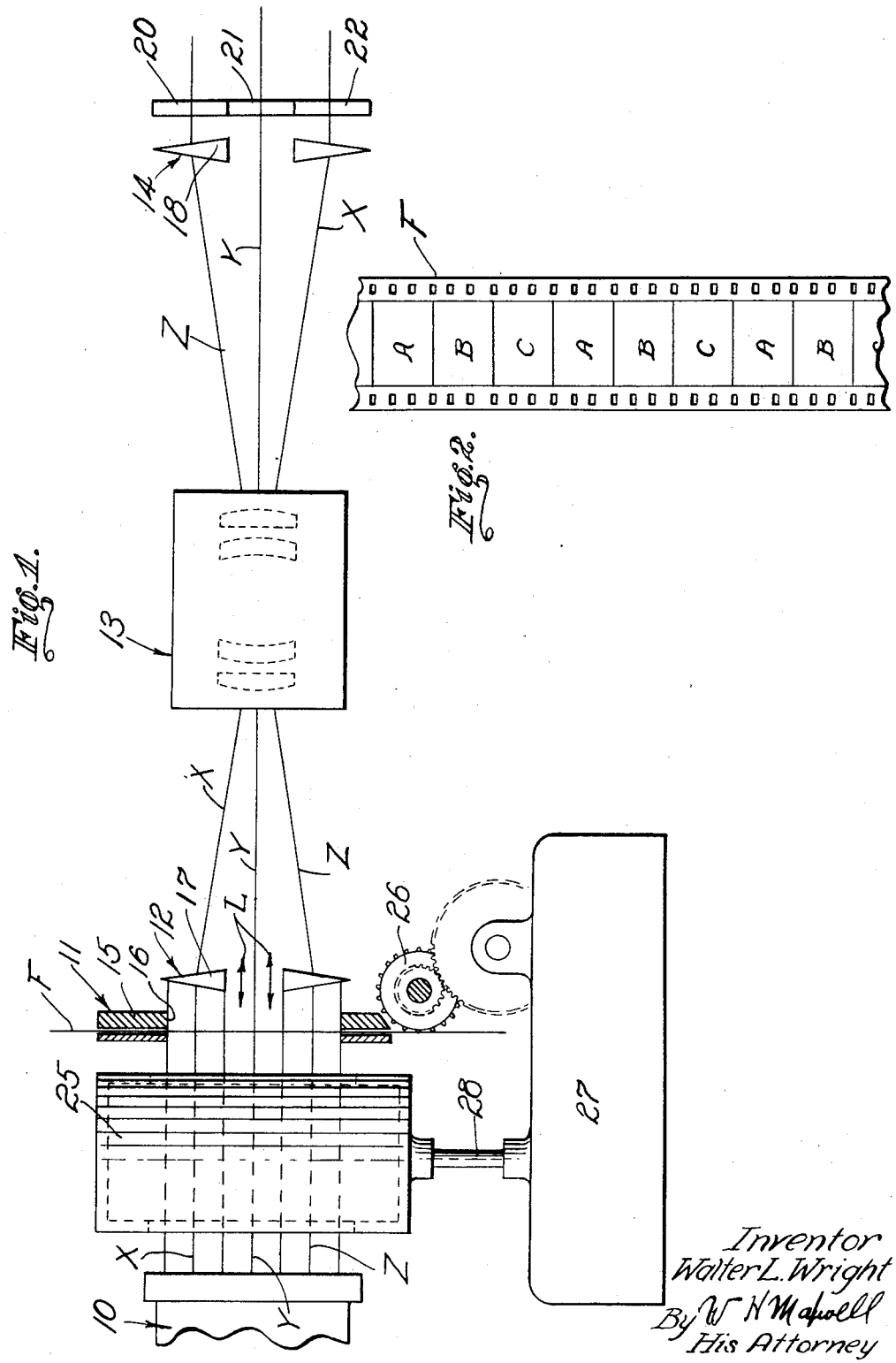
Inventor
Walter L. Wright
By W H Maxwell
His Attorney Patented Dec. 12, 1933

1,938,950

UNITED STATES PATENT OFFICE 1,938,950

OPTICAL SYSTEM FOR PROJECTORS

Walter L. Wright, Santa Monica, Calif., assignor to Synchrome Corporation, Los Angeles County, Calif., a corporation of California Application March 2, 1931. Serial No. 519,335

3 Claims. (Cl. 88—16.4)

This invention has to do with motion picture apparatus and has particular reference to an optical system for projectors. It is a general object of the present invention to provide a simple, effective, and practical optical system for use in projecting a plurality of pictures onto a screen simultaneously and in register.

In accordance with certain methods of producing motion pictures in color, a film is produced carrying series of images of a subject, each series of images comprising a plurality, usually three images, arranged along the film, each image of a series being of a different color value of the subject. My present invention is not specifically concerned with the production of the film referred to, but is concerned with the projection of such film to obtain projected images of the several pictures of a series in register on a screen. For purpose of example I will refer to a motion picture film in which each series of pictures comprises three pictures arranged side by side along the film, each picture being of a different color value of the subject, the several pictures having been taken simultaneously and from a single point of vision so that they will register to form a perfect picture on a screen when projected onto the screen in register.

It is an object of the present invention to provide an optical system for projecting a film of the character mentioned, which system requires but few simple light-handling parts.

It is a further object of the present invention to provide an optical system of the character mentioned in which a projection lens of a size and type practical for commercial use can be used. The system of the present invention may be carried out with a lens of about the same size and construction as is ordinarily employed in the projection of motion pictures.

Another object of this invention is to provide an optical system of the character mentioned which is without mirrors or reflectors liable to create distortion or variation in the projected images.

Another object of the present invention is to provide an optical system of the character mentioned in which the shafts of light passing through the outermost pictures or end pictures of the series of pictures on the film are directed inwardly by prisms so that the light from the end pictures after passing through the projection lens are definitely separated from the shaft of the middle picture to be individually acted upon by optical elements in front of the projection lens.

The various objects and features of my invention will be best and more fully understood from the following detailed description of a typical form and application of the invention, throughout which description reference will be had to the accompanying drawing, in which:

Fig. 1 is a diagrammatic view illustrating the optical system provided by this invention, and Fig. 2 is a diagrammatic view illustrating the type of motion picture film that can be handled by the optical system of the present invention.

The present invention may be employed to handle film of various forms or types, but is particularly suited to handling a film F carrying a plurality of series of pictures of a subject, each series including pictures A, B, and C, each of different color values of a subject: for instance, the picture A may be of the orange values of the subject, the picture B of the violet values of the subject, and the picture C of the green values of the subject. The arrangement of the pictures of each series and the manner in which the several series of images occur on the film are illustrated in Fig. 2. The several images or pictures of each series are alike except for their being of different color values of a subject, i. e., the several pictures of each series show the subject in exactly the same position and are taken from the same angle or point of vision.

The optical system provided by the present invention includes, generally, a source of light 10, a film gate 11 for holding the film F in the path of light from the source 10 so that light is simultaneously projected through the several pictures of a series, means 12 intercepting the light passing through the end pictures of the series to deflect the light so that the shafts carrying the images of the end pictures of the series converge to intersect the shaft carrying the image of the center picture of the series at a point a short distance beyond the film, a projection lens 13 passing the several shafts carrying the images from the film, means 14 beyond the projection lens 13 for passing the light deflected by the means 12 to correct the direction of travel and to neutralize distortion created by the means 12, and various other elements the details of which will be hereinafter described.

The source of light 10 may be a single source of light, or it may be a plurality of individual sources operating to direct three shafts of light through the film F held in the gate 11. The axes of the several shafts are designated in the drawing as X, Y, and Z. It is to be understood that, in the case of a single source of light, the several axes X, Y, and Z may occur in one large shaft of light which is directed onto the film F at the gate 11.

The film gate 11 may be of any suitable construction which will properly hold and guide the film F so that it intersects the light from the source 10. In the drawing, the means 11 is shown as including an aperture plate 15 having an aperture 16 of such size and proportions as to allow the passage of light through the several pictures A, B, and C of a series of pictures on the film F.

The means 12 operates to deflect only the light passing through the end pictures, that is, the pictures A and C, of the series of pictures on the film, so that they converge to intersect the shaft of light passing through the center picture B at a point a short distance beyond the film F. I provide two prisms 17 in the path of the shafts of light passing through the pictures A and C and spaced apart so that they do not interfere with the passage of the shaft of light passing the picture B. The prisms 17 are arranged and are of such proportions as to deflect the shafts of light passing the pictures A and C the desired amount, preferably an amount such as to cause these shafts to intersect the shaft of light passing the picture B at or about the center of the projection lens 13. The diagram Fig. 1 illustrates the manner in which the prisms 17 deflect the shafts of light passing the pictures A and C so that they converge and intersect the shaft of light passing the picture B.

The projection lens 13 is located at the proper distance beyond the film F. In the preferred form of the invention, the system is designed so that the projection lens 13 occurs at the point of intersection of the several shafts of light passing the pictures of the film F. The projection lens may be of a type or design similar to that ordinarily employed in the projection of motion pictures.

At a suitable distance beyond the projection lens 13 I provide the means 14 which operates to intercept the shafts of light handled by the prisms 17 of the means 12 to deflect said shafts so that they extend substantially parallel with the shaft passed by the center pictures B in order that the several shafts may fall upon a screen in register. The means 14 includes a prism 18 arranged to intercept each shaft of light deflected by the means 12. The prisms 18 of the means 14 are located somewhat ahead of the projection lens 13 and are spaced apart so that the shaft of light passed through the picture B passes between them without interference. The prism 18, arranged to intercept the shaft of light passed by the picture A, is reversed in arrangement to the prism 17 which passes the shaft of light from the picture A, and the two prisms are balanced so that prismatic distortion caused by one prism is neutralized by the other. The same relationship and balance is provided between the prisms handling the shaft of light passing the picture C. In practice, the prisms 17 are mounted in the apparatus so that they may be suitably shifted or adjusted, as indicated by the arrows L to properly position them in the shafts of light which they intercept, it having been found that, by suitably shifting or adjusting the positions of the prisms, the images of the pictures A and C can be readily brought into register on a screen with the image of the picture B.

In the case of a film F carrying black and white images of the different color values of a subject, for instance, the orange, violet, and green values of the subject, it is desired to provide means for chromatically influencing the several shafts of light. Color filters 20, 21, and 22 may be inserted in the system at a suitable point. I have illustrated color filters located immediately beyond the prisms 18. In a case where the pictures A, B, and are of the orange, violet, and green values of a subject, respectively, the filters 22, 21, and 20 will be orange, violet, and green, respectively.

It is to be understood that the apparatus may include the various elements common to projectors, for instance, it may include a shutter 25 for intermittently interrupting the light, a movement sprocket 26, or the like, for intermittently advancing the film through the gate 11, a movement mechanism 27, etc. In the diagram Fig. 1, I have illustrated a barrel type shutter 25 interposed between the source of light 10 and gate 11 which carries the film F. I have shown a movement mechanism 27 arranged to drive the feed sprocket 26 and also operating the drive shaft 28 of the shutter. It will be understood, of course, that the feed sprocket and shutter are related through the movement mechanism or through other suitable means so that they operate in proper synchronism to cause the light to be cut off during movement of the film and allowed to project through the system only when the film is stationary in the gate 11.

From the foregoing description it will be apparent that I have provided an optical system that is extremely simple and in which the light is handled so that the images are not distorted but are brought into register on a screen.

Having described only a typical preferred form of my invention, I do not wish to limit myself to the specific details set forth, but wish to reserve to myself any changes or variations that may appear to those skilled in the art or fall within the scope of the following claims:

Having described my invention, I claim:

1. Apparatus for projecting a series of pictures occurring longitudinally on a film including, means projecting shafts of light through the several pictures of the series substantially perpendicularly to the plane of the film, means receiving the shafts that have been passed by the end pictures of the series and directing them inwardly to intersect the shaft passed by the middle picture of the series, a single projection lens passing the several shafts passed by the film, the second mentioned means being located between the film and lens, and means beyond the lens directing the shafts passed by the end pictures of the series onto a screen in register with the shaft passed by the middle picture of the series.

2. Apparatus for projecting a series of pictures occurring longitudinally on a film including, means projecting shafts of light through the several pictures of the series substantially perpendicularly to the plane of the film, a pair of spaced prisms receiving the shafts that have been passed by the end pictures of the series and directing them inwardly to intersect the shaft passed by the middle picture of the series, a single projection lens passing the several shafts passed by the film, the said prisms being located between the film and lens, and a pair of spaced prisms beyond the lens directing the shafts passed by the end pictures of the series onto a screen in register with the shaft passed by the middle picture of the series, the prisms of both pairs being spaced apart so that the shaft passed by the middle picture is not interrupted.

3. Apparatus for projecting a series of pictures occurring longitudinally on a film including, a gate holding the film, means projecting shafts of light through the several pictures of a series at the gate substantially perpendicularly to the plane of the film, a pair of spaced prisms receiving the shafts that have been passed by the end pictures of the series and directing them inwardly to intersect the shaft passed by the middle picture of the series and passed between the prisms, a single projection lens spaced forwardly of the gate relative to the direction of travel of the light shafts passing the shafts of light at a point where they are close together, the said pair of prisms being located between the gate and lens, a pair of spaced prisms beyond the lens spaced to pass the shaft passed by the middle picture directly onto a screen and intercepting the shafts passed by the end pictures of the series to direct them onto a screen in register with the shaft passed by the middle picture, and color filters in the paths of the several shafts of light adjacent the last mentioned prisms.

WALTER L. WRIGHT.